July 26, 1927.
R. O. FRONTZ
1,636,990
ANTISKID CHAIN FOR AUTOMOBILES
Filed Jan. 27, 1927
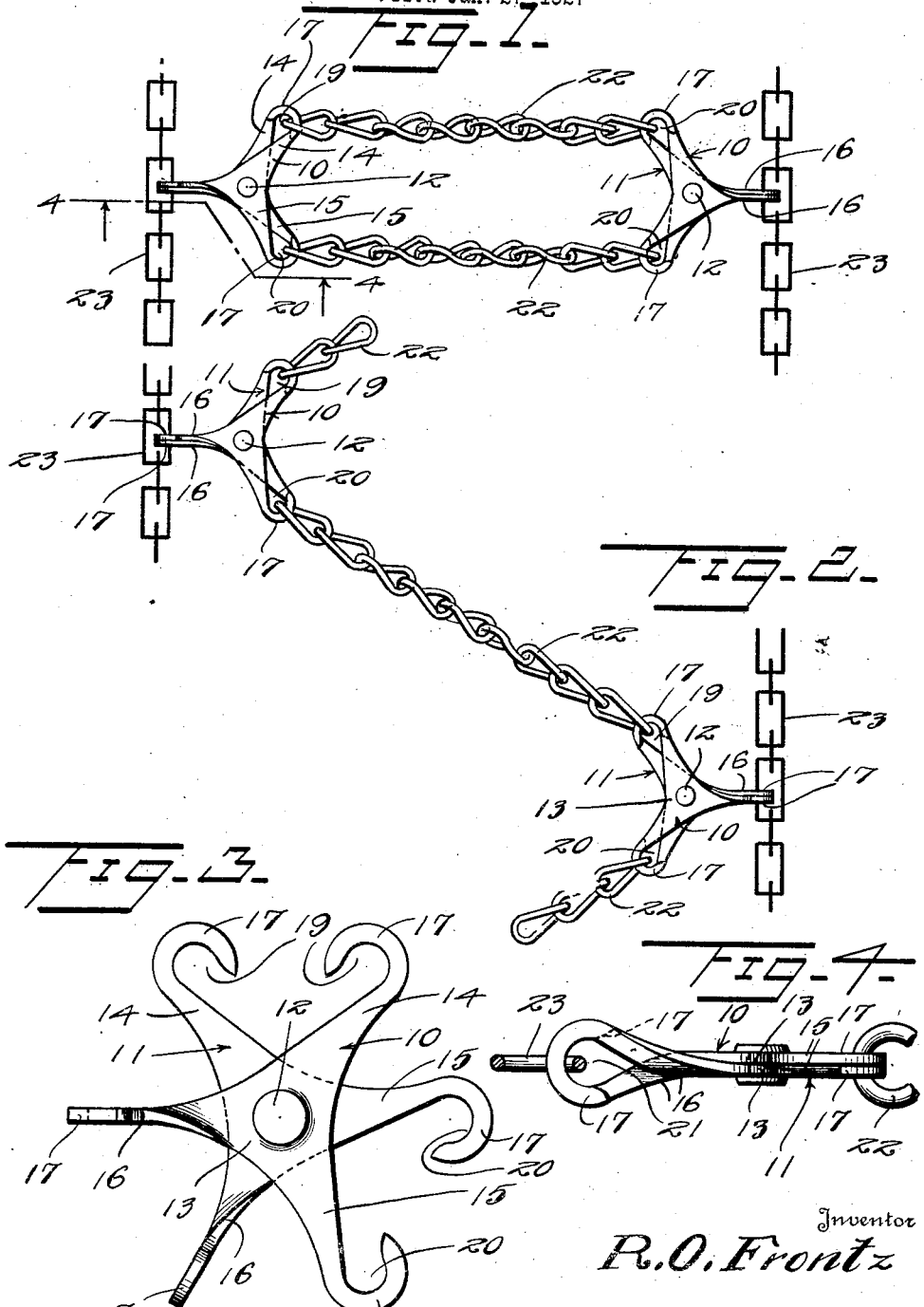
Inventor
R. O. Frontz
By Watson E. Coleman
Attorney

Patented July 26, 1927.

1,636,990

UNITED STATES PATENT OFFICE.

ROBERT O. FRONTZ, OF JUNIATA, PENNSYLVANIA, ASSIGNOR OF ONE-HALF TO GEORGE A. MELSON, OF JUNIATA, PENNSYLVANIA.

ANTISKID CHAIN FOR AUTOMOBILES.

Application filed January 27, 1927. Serial No. 164,049.

This invention relates to anti-skid chains for automobiles and more particularly to a member for connecting the chain elements thereof one to another.

An important object of the invention is to produce a device of this character of such structure that a worn or broken chain element may be immediately removed and replaced without the necessity of removing the chain from the tire.

A further object of the invention is to produce a chain connector which enables the cross chains of the tire to be extended either transversely or diagonally across the tread of the tire.

A still further object of the invention is to provide a device of this character which may be very readily and cheaply manufactured, which will be durable and efficient in service and a general improvement in the art.

Figure 1 is a fragmentary plan view showing connectors constructed in accordance with my invention employed to connect the cross chains of anti-skid chains in parallel;

Figure 2 is a similar view showing the connectors employed for connecting the cross chains to extend diagonally of the tire;

Figure 3 is a plan view of one of the connectors with the sections rotated to the position in which the chain links may be inserted or removed;

Figure 4 is a detail side elevation of the connector in its chain engaging position.

Referring now more particularly to the drawings, the connector is formed in two sections 10 and 11 pivotally connected to one another, as at 12. Each section 10 and 11 is in the form of a hub 13 having three substantially uniformly spaced radiating arms 14, 15 and 16, the outer ends of which are formed as hooks 17. The hooks of the arms 14 and 15 lie in the general plane of the member, while the arm 16 is twisted intermediate its ends, as indicated at 18, so that its hook 17 lies in a plane at right angles to the general plane of the member. In connecting the members 10 and 11 by the pivot, they are oppositely engaged therewith with corresponding arms thereof in alignment. This causes the hook 17 of the sections 10 and 11 to face in opposite directions, so that they may combine to form eyes 19, 20 and 21 at the ends of the arms 14, 15 and 16. The eyes 19 and 20 are adapted to receive the ends of cross chains 22 which, as illustrated in the drawings, may either extend directly transversely of the tire or diagonally thereacross. The eye 21 receives the side chain 23.

It will be obvious that if, at any time, a cross chain 22 becomes worn or broken so that its removal is desired, it is simply necessary to relatively rotate the sections 10 and 11, so that the eyes 19 and 20 are open sufficiently to permit the disengagement of the chain therefrom. It will also be obvious that this operation can be carried out without the necessity of removing the chain from the tire.

Since the construction hereinbefore set forth is capable of a certain range of change, and modication without materially departing from the spirit of the invention, I do not limit myself to such specific structure except as hereinafter claimed.

I claim:—

1. A connector for the cross and side chains of automobile anti-skid chains comprising a pair of sections connected for relative rotation, each of said sections including a plurality of radiating arms having hooks at their ends, the hooks of the sections facing oppositely whereby in one position of the sections they combine to produce eyes in which chains may be secured, the hooks of one of the arms of each member being arranged in a plane substantially at right angles to the general plane of the member, the remaining hooks being arranged in the general plane of the member.

2. A connector for the cross and side chains of automobile anti-skid chains comprising a pair of sections connected for relative rotation, each of said sections including a plurality of radiating arms having hooks at their ends, the hooks of the sections facing oppositely whereby in one position of the sections they combine to produce eyes in which chains may be secured, the eye produced by one of the pairs of coacting arms being perpendicular to the general plane of the connector, the remaining eyes lying in the plane of the connector.

In testimony whereof I hereunto affix my signature.

ROBERT O. FRONTZ.